United States Patent [19]

Fukushima et al.

[11] Patent Number: 5,398,543
[45] Date of Patent: Mar. 21, 1995

[54] METHOD AND APPARATUS FOR DETECTION OF VACUUM LEAK

[75] Inventors: Yukio Fukushima, Kawasaki; Kyoichi Sekiguchi, Yokohama; Yuzuru Higo, Urawa; Nagaru Agatuma, Tsuchiura; Junichi Hashimoto, Yashio, all of Japan

[73] Assignee: Hitachi Building Equipment Engineering Co., Ltd., Tokyo, Japan

[21] Appl. No.: 87,969

[22] Filed: Jul. 8, 1993

[30] Foreign Application Priority Data

Jul. 8, 1992 [JP] Japan .................. 4-181037
Dec. 22, 1992 [JP] Japan .................. 4-342739

[51] Int. Cl.$^6$ .................. G01M 3/22; G01M 3/04
[52] U.S. Cl. .................. 73/40.7; 73/40.5 R
[58] Field of Search .................. 73/40.7, 40.5

[56] References Cited

U.S. PATENT DOCUMENTS

| | | | |
|---|---|---|---|
| 3,968,675 | 7/1976 | Briggs | 73/40.7 |
| 4,195,224 | 3/1980 | Sanger et al. | 73/40.7 |
| 4,436,998 | 3/1984 | Tallon | 73/40.7 |
| 4,472,962 | 9/1984 | Mennenga | 73/40.7 |
| 4,510,792 | 4/1985 | Morel | 73/40.7 |
| 4,683,749 | 8/1987 | Thurlow et al. | 73/40.7 |
| 4,688,627 | 8/1987 | Jean-Luc et al. | 73/40.7 |
| 4,735,084 | 4/1988 | Fruzzetti | 73/40.7 |
| 4,983,829 | 1/1991 | Bürger | 73/40.7 |
| 5,022,265 | 6/1991 | Voss | 73/40.7 |
| 5,168,747 | 12/1992 | Weaver et al. | 73/40.7 |

OTHER PUBLICATIONS

K. M. Dubowski, *Breath Analysis as a Technique in Clinical Chemistry*, Clin. Chem. 20.966-972 (1974).

A. Manolis, *The Diagnostic Potential of Breath Analysis*, Clin. Chem. 29.5-15 (1983).

M. Phillips, *Breath Tests in Medicine*, Scientific American, Jul., 1992.

H. M. Liebich, *Gas Chromatographic-Mass Spectrometric Determination of Total 4-heptanone, A New Marker in Diabetes Mellitus*, 273 Journal of Chromatography 67-75 (1983).

H. M. Liebich, *Gas Chromatographic Profiling of Ketone Bodies and Organic Acids in Diabetes*, 379 Journal of Chromatography 347-66 (1986).

Primary Examiner—Hezron E. Williams
Assistant Examiner—J. David Wiggins
Attorney, Agent, or Firm—Sixbey, Friedman, Leedom & Ferguson; Gerald J. Ferguson, Jr., Thomas W. Cole

[57] ABSTRACT

The present invention provides a method for detection of a vacuum leak of a vacuum vessel provided in an equipment, for example, an absorption chiller, and in which water and a solution (for example, lithium bromide solution) are charged. The gas in the vacuum vessel is purged by an auxiliary air pump while spraying helium as trace gas by a helium spray gun to the outer surface of the vacuum vessel under inspection of the absorption chiller, a part of the purged gas is passed through a dehumidifier where the steam is removed from the gas, a part of the purged gas is depressurized by reducing the partial pressure of the steam to zero, and it is detected by a helium-leak detector whether or not the trace gas (helium) leaks from the vacuum vessel. This method and an apparatus for carrying out the method permit to check for any vacuum leak and quantitatively determine it quickly, easily and with a high sensitivity whether the equipment under inspection is in or out of operation.

4 Claims, 4 Drawing Sheets

METHOD AND APPARATUS FOR DETECTION OF VACUUM LEAK

BACKGROUND OF THE INVENTION a) Field of the Invention

The present invention relates to a method and apparatus for detection of a vacuum leak of a vacuum vessel provided in an equipment such as an absorption chiller and in which a refrigerant and working fluid are charged.

b) Prior-art Statement

In an absorption chiller, for example, water used as refrigerant and a lithium bromide solution used as working fluid are charged in a closed vessel. Generally, the water and solution are kept under a pressure lower than the barometric pressure. More particularly, the delivery port of a solution pump is kept under a negative pressure. The low-pressure side is kept at 0.9 to 2.0 kPa while the high-pressure side is at 2.7 to 5.3 kPa. Therefore, if the airtightness of the closed vessel is poor, the atmosphere will come into the closed vessel.

Conventionally, there was not available any technology which could detect a vacuum leak quickly, easily and with a high sensitivity by a simple apparatus. Namely, it was not until the absorption chiller showed a degradation in refrigerating ability caused by a vacuum leak that the entry of the atmosphere into the closed vessel was found out. To find out early on about such vacuum leak, it is well known to use (a) a soapy water method, (b) halogen gas method and (c) helium pressure detection method. To effect any of such conventional methods, however, the chiller must be put out of operation, charged with such nitrogen gas to pressurize the chiller, and thus they cannot readily be carried out.

The use of soapy water is a classic method for detecting a leak. It is of no practical use since it cannot be done with a high sensitivity and takes much labor and time. Also, to detect such vacuum leak by any one of these methods (a), (b).and (c), the absorption chiller under inspection must be put out of operation and the refrigerant (water) and lithium bromide solution (working fluid) must be discharged from the chiller. These are great disadvantages of the prior art.

SUMMARY OF THE INVENTION

The present invention has an object to overcome the abovementioned drawbacks of the prior art by providing a method by which an absorption chiller can be inspected for any vacuum leak quickly, easily and with a high sensitivity whether the chiller is in or out of operation and a vacuum leak, if any, can be quantitatively determined, and an optimum apparatus for carrying out the method. The present invention is not only applicable to absorption chillers but also to general vacuum vessels in which water and solution are charged.

The pressure in the vacuum vessel under inspection is lower than the barometric pressure. So if the atmosphere has entered into the vacuum vessel, a trace gas sprayed to a leak point in question will be sucked into the vacuum vessel. Thus, by detecting the trace gas in the vacuum vessel, it can be determined whether or not there is a leak. However, the existence of a steam in the vacuum vessel under inspection, makes it difficult to detect the trace gas sucked into the vessel. According to the present invention, the gas in the vacuum vessel is purged, the purged gas is passed through a dehumidifier to remove the steam from the gas and thereafter the trace gas is detected.

When an absorption chiller is operating under normal conditions, the pressure in the vacuum vessel is 1.3 to 5.3 kPa which corresponds to the steam pressure of water. So the trace gas, even if mixed in the steam, cannot easily be detected. However, when the gas is cooled down to, for example, $-50°$ C. in the dehumidifier, the steam is removed so that the partial pressure thereof will disappear and the pressure in the vacuum vessel will be reduced to 7 to 27 Pa. In this condition, the trace gas can be detected quickly, easily and with a high sensitivity by, for example, a detector of a mass spectrometer type.

DETAILED DESCRIPTION OF THE PREFERRED EMBODIMENTS

Figure 1:
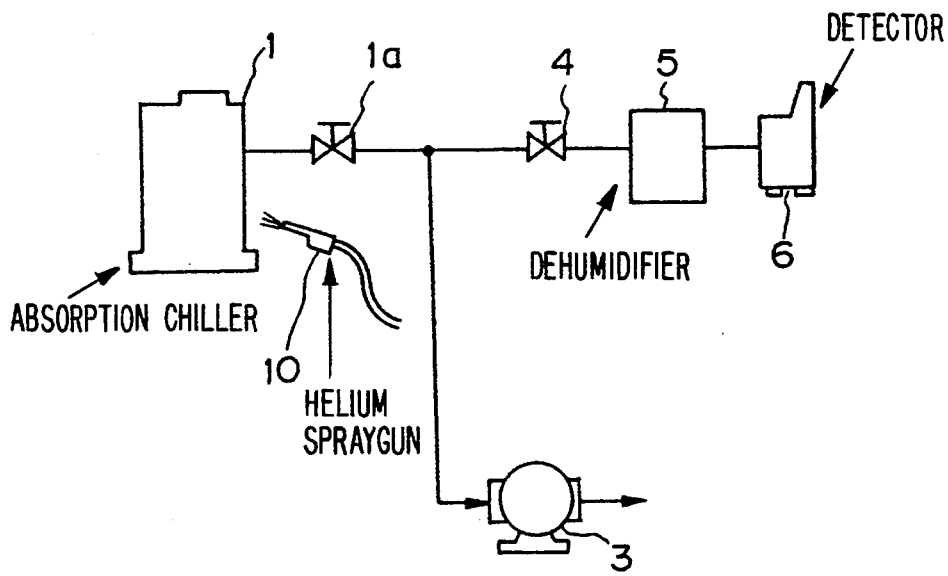
FIG. 1 is a schematic system diagram for explanation of one embodiment of the present invention.

FIG. 1 is a schematic system diagram of a system adapted for carrying out the method for detection of vacuum leak according to the present invention.

An absorption chiller generally indicated with a reference numeral 1 is connected via a valve 1a belonging thereto to an auxiliary air pump 3 provided for purging the gas from inside the absorption chiller 1. A pipe branched from the middle of the pipe connected between the auxiliary air pump 3 and the valve 1a of the chiller I is connected via a pressure regulating valve 4 and dehumidifier 5 to a helium-leak detector 6 of a mass spectrometer type. This embodiment employs a portable-type helium-leak detector as modified to realize the present invention, i.e. the helium-leak detector 6. The modifications will be discussed in detail later with reference to FIG. 5. The portable-type helium-leak detector is designed to use helium as the trace gas and it comprises a turbo-molecular pump and a high sensitivity mass spectrometric tube of a 60-deg. deflected field type. In the embodiment of the method according to the present invention, any other gas than helium may be used as the trace gas. However, since helium is small in molecular weight, it can easily pass through a small space. Being inactive, it will not corrode any equipment and appliances and will not react with any solution. Being so safe and innocuous, it is advantageously usable as the trace gas.

In the embodiment shown in FIG. 1, a helium spray gun 10 is used to spray helium as the trace gas to the outer surface of the absorption chiller 1 while the auxiliary air pump 3 and the helium-leak detector 6 are in operation.

By purging, by means of the auxiliary air pump 3, the gas from inside the absorption chiller I being operated, the pressure of the purged gas becomes 1.3 to 5.3 kPa. If the closed vessel (vacuum vessel) of the absorption chiller I incurs a leak, the helium gas as trace gas will enter along with air into the closed vessel. Thus, the gas purged by the auxiliary air pump 3 is a mixture of steam, air (oxygen and nitrogen) and helium and has a pressure of 1.3 to 5.3 kPa. When the steam is removed by passing the mixture through the dehumidifier 5, the partial pressure of the steam will be zero and so the pressure of the mixture will be considerably reduced. In this embodiment, the mixture is cooled down to $-50°$ C. by the dehumidifier 5 to condense the steam to a frost and the frost thus produced is removed, thereby reducing the pressure in the closed vessel down to 7 to 27 Pa. This pressure reduction is regulated by operating a pressure regulating valve 4 depending upon the ability (power) of the dehumidifier 5.

Figure 2:
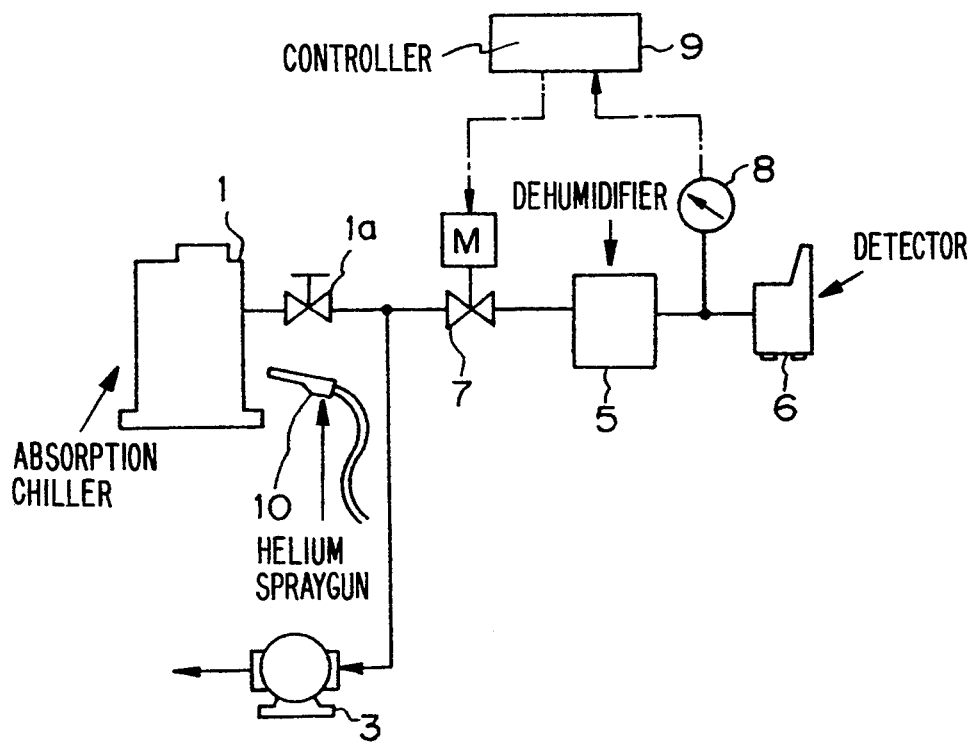
FIG. 2 is a schematic system diagram for explanation of another embodiment of the present invention.

FIG. 2 is a schematic system diagram for explanation of an embodiment different from that shown in FIG. 1. According to this embodiment, the pressure of the gas passed through the dehumidifier 5 is detected by a pressure gauge 8 from which a detected-pressure signal output is supplied to a controller 9 which in turn will control an electrically operated valve 7. Namely, the output signal from the pressure gauge 8 will be indicative of a pressure of 7 to 27 Pa. Thus, the operation of the pressure regulating valve 4 in the aforementioned embodiment (shown in FIG. 1) can be automated.

The spraying of helium by using the helium spray gun 10 is not done to the entire outer surface of the absorption chiller I at a time but to a limited area of that outer surface. The spraying is done by shifting the spray gun 10 sequentially from one to a next limited area of the outer surface of the chiller 1 (that is, the outer surface of the chiller 1 is scanned by the spray gun 10). This manner of helium spraying permits one to locate a leak, if any, on the outer surface of the chiller 1. This scanning may be done sequentially from one end to the other end of the chiller 1 (in an extensive manner). Also it may be started at a location, where leak is likely to take place most frequently, from the economic point of view and then it can be done to other possible locations (in an intensive manner).

In the embodiments having been discussed in the foregoing with reference to FIGS. 1 and 2, the auxiliary air pump 3 provided separately from the absorption chiller 1 and dedicated for the airtightness test is used to evacuate the closed vessel. However, an air pump belonging to the absorption chiller under inspection may be appropriately utilized for carrying out the present invention.

Also, according to the embodiments shown in FIGS. 1 and 2, the leak test is done while the absorption chiller 1 is in operation. Of course, however, the method according to the present invention can be carried out even while the chiller 1 is out of operation.

Figure 3:
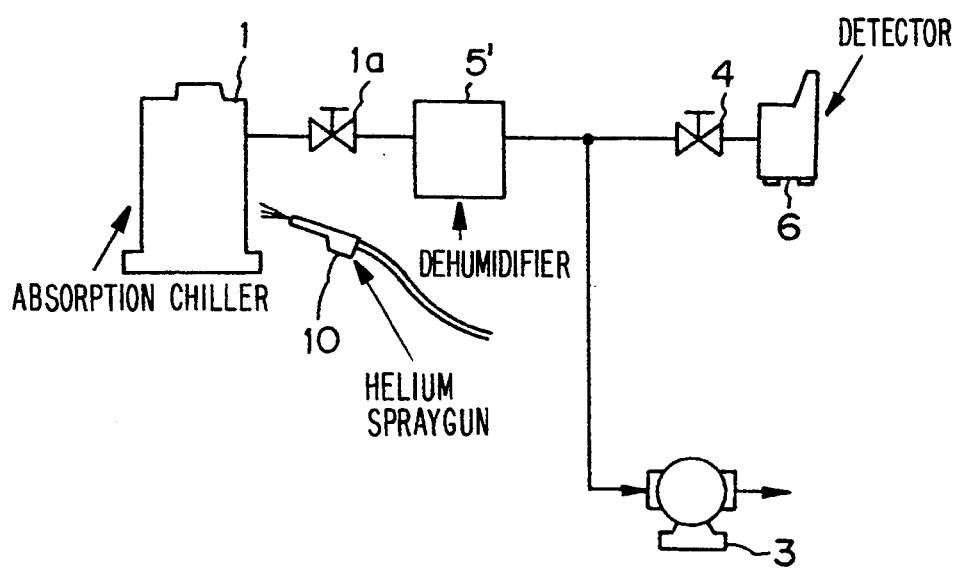
FIG. 3 is a schematic system diagram for explanation of a still another embodiment of the present invention.

FIG. 3 is a schematic system diagram for explanation of an embodiment different from those previously described.

The components used in this embodiment are same as or similar to those in the embodiment in FIG. 1, but they are connected or piped in a different manner.

In this embodiment, the gas in the absorption chiller 1 is purged via a dehumidifier 5' by means of the auxiliary air pump 3. The purged gas is led through the pressure regulating valve 4 into the helium-leak detector 6 where the existence of the helium gas is detected. If the helium gas is detected, it is possible to locate the leak and estimate which of the closed vessels in the chiller 1 incurs the leak, in the similar manner to that in the aforementioned embodiments. Also in the embodiment shown in FIG. 3, the pressure regulating valve 4 is adjusted depending upon the operating condition (power) of the dehumidifier 5' to regulate the gas pressure to an appropriate level (7 to 27 Pa).

Figure 4:
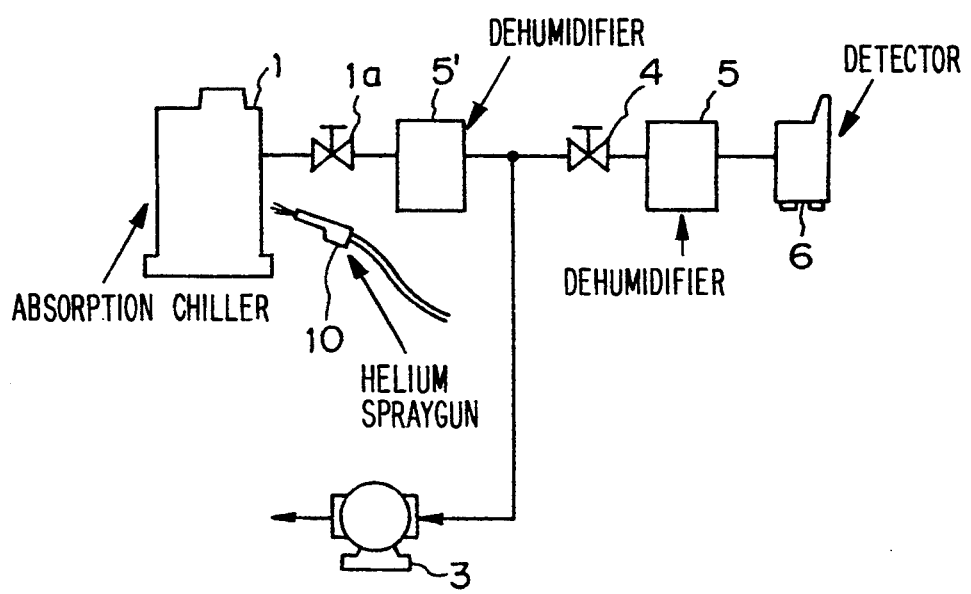
FIG. 4 is a schematic system diagram for explanation of a yet another embodiment of the present invention.

FIG. 4 is a schematic system diagram for explanation of a further embodiment different from those aforementioned ones. In this embodiment, the gas in the absorption chiller 1 is purged via the dehumidifier 5' by means of the auxiliary air pump 3 and a part of the purged gas is led into the helium-leak detector 6 via the pressure regulating valve 4 and dehumidifier 5''. Also in this embodiment, the gas pressure is regulated by adjusting the pressure regulating valve 4. This embodiment permits a more positive pressure reduction by removal of the steam.

Figure 5:
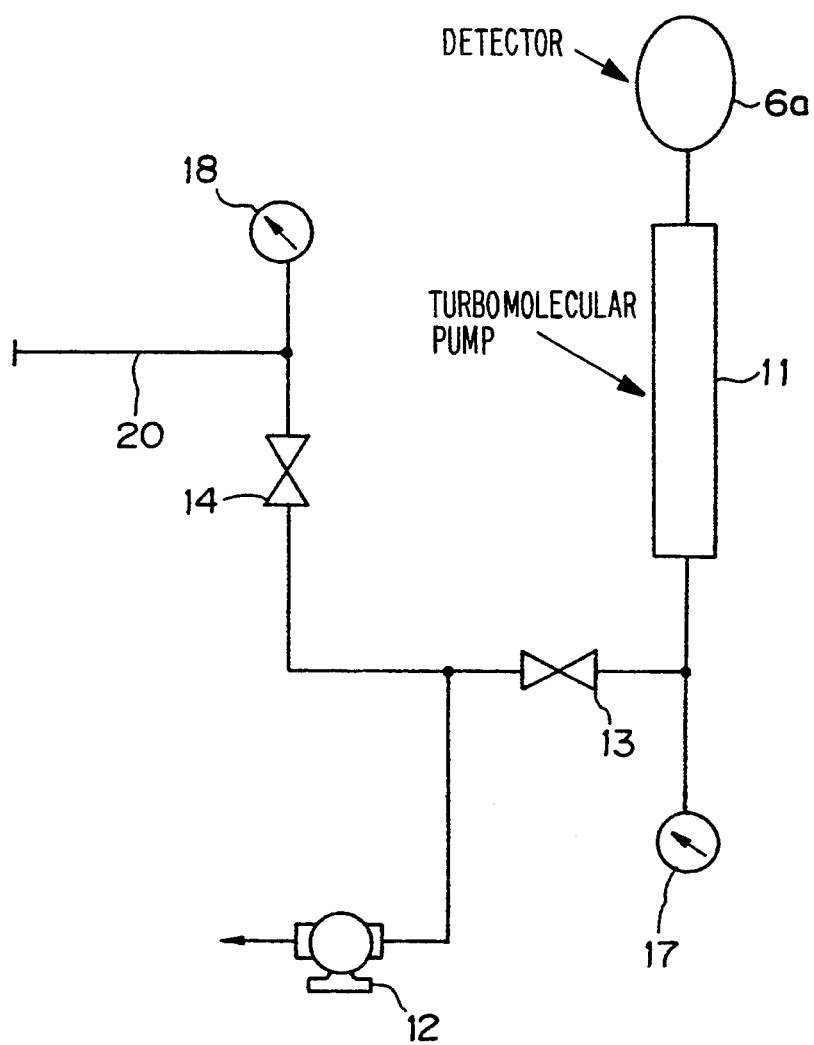
FIG. 5 is a schematic system diagram for explanation of a conventional helium-leak detector.

Next, a vacuum leak detector worked out for carrying out the method according to the present invention will be described below. FIG. 5 is a schematic system diagram of a commercially available conventional helium-leak detector. This conventional detector is given here for comparison with the present invention.

In this conventional vacuum-leak detector, the high vacuum side of a turbo-molecular pump 11 is to be connected to a helium detecting analysis tube 6a. Since the turbo-molecular pump 11 cannot deliver to the atmosphere the gas sucked by evacuating the chiller, the back pressure side of the turbo-molecular pump 11 is connected to an auxiliary vacuum pump 12 via a first valve 13 so that the back pressure side of the turbo-molecular pump 11 is reduced to the order of 0.13 kPa. The auxiliary vacuum pump 12 refers to a pump which is capable of sucking in a gas under a pressure of about 0.13 kPa and delivering it to the atmosphere.

In FIG. 5, the reference numerals 17 and 18 denote vacuum gauges, respectively. The suction side of the above-mentioned auxiliary vacuum pump 12 is connected to an interconnecting pipe 20 of a vacuum exhaust system via a second valve 14. In case the conventional apparatus as shown in FIG. 5 is used for carrying out the method according to the present invention, the interconnecting pipe 20 is connected to a vacuum vessel of a chiller.

As described above, the turbo-molecular pump 11 will not work well unless the back pressure is lower than 0.13 kPa. When the back pressure is 0.13 kPa or over, the protective circuit (not shown) will be activated and cause the pump 11 to stop operating. However, when the method for detection of vacuum leak according to the present invention is carried out with a vacuum exhaust system connecting pipe 20 connected to, for example, an absorption chiller, a mixture of air, steam and helium gas is purged and the sum of partial pressures of these gases is about 1.3 kPa. When the gas mixture is depressurized to 0.13 kPa, the partial pressure of the helium in the depressurized gas mixture becomes less than 1.3 Pa, that is, the helium is not easy to detect.

Figure 6:
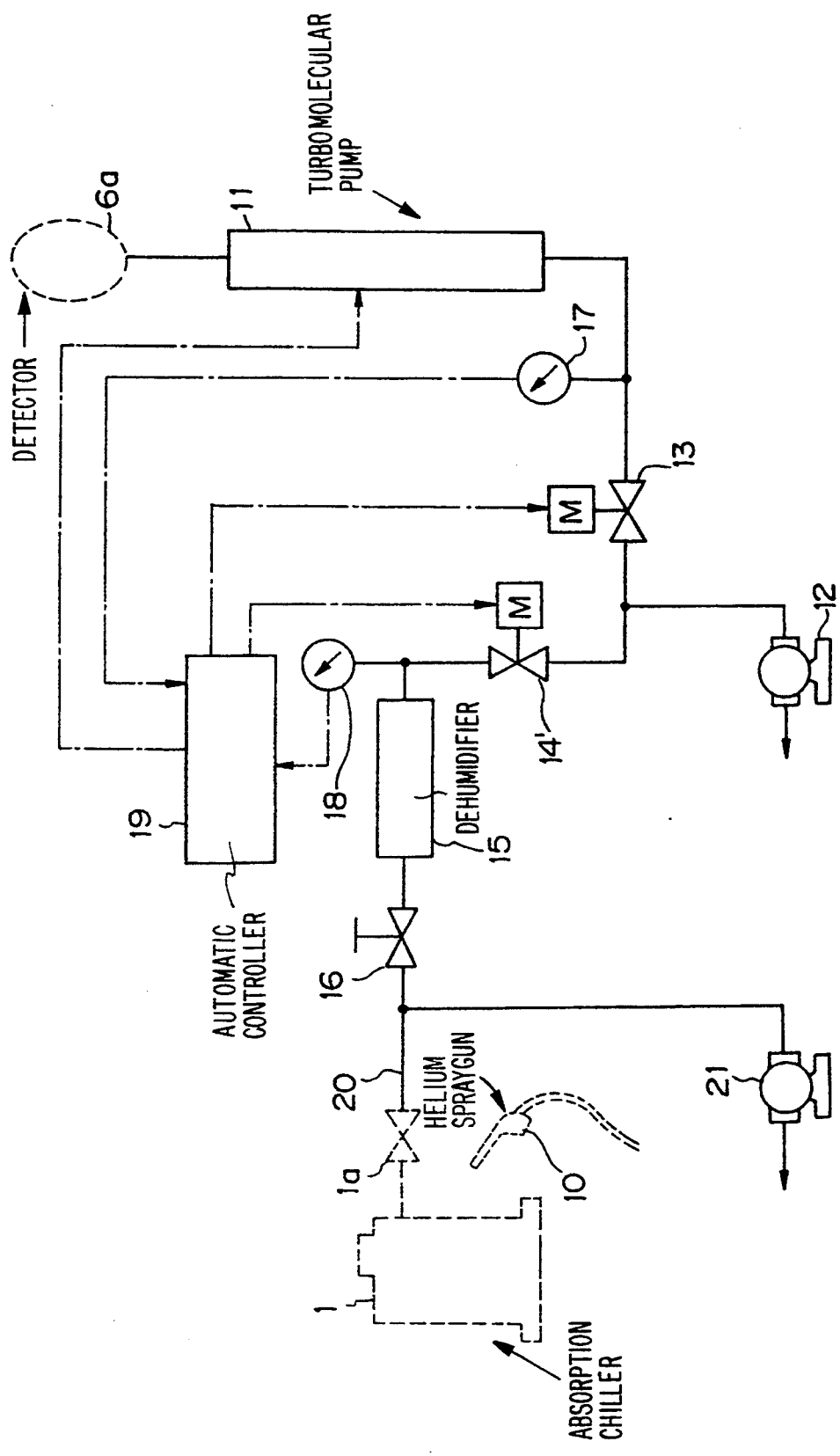
FIG. 6 is a system diagram of one embodiment of the apparatus according to the present invention.

FIG. 6 shows an embodiment of the vacuum leak detector according to the present invention. In this embodiment, the back pressure side of a turbo-molecular pump 11 is connected to the suction side of an auxiliary vacuum pump 12 via a first valve 13' while the suction side of the auxiliary vacuum pump 12 is connected to a vacuum exhaust system connecting pipe 20 via a dehumidifier 15.

Owing to this arrangement, steam is removed from the gas mixture passed to the back pressure side of the turbo-molecular pump 11, resulting in a gas mixture of air and helium. Therefore, the partial pressure of helium gas, attained when the sum of the partial pressure of air and that of helium is maintained at 0.13 kPa, is considerably high as compared with that in the conventional system and can be detected with a high sensitivity.

In use of the embodiment of the apparatus according to the present invention, shown in FIG. 6, the auxiliary vacuum pump 12 is put into operation with the first valve 13' opened and a second valve 14' closed. After a vacuum gauge 17 detects a pressure value of 0.13 kPa, the turbo-molecular pump 11 is put into operation. And such a control is made that the reading of the vacuum gauge 17 (that is, the back pressure of the turbo-molecular pump 11) will not exceed 0.13 kPa.

By providing an automatic controller 19 which, receiving a signal output from the vacuum gauge 17, provides on and off signals for the turbo-molecular pump 11, the turbo-molecular pump 11' in the embodiment shown in FIG. 6 can be automatically put into operation.

For suction through the vacuum exhaust system connecting pipe 20, an auxiliary roughing vacuum pump 21 is put into operation with the first valve 13' closed for protection of the turbo-molecular pump 11 and second valve 14' opened. When the vacuum gauge 18 detects a pressure of less than 0.13 kPa, the first valve 13' is opened and the apparatus gets ready for detection of vacuum leak. By adapting the automatic controller 19 to open and close the first and second valves 13' and 14', all the preliminary operations of the apparatus can be fully automated.

As having been described in the foregoing, the method according to the present invention is practically effective in quantitatively determining a vacuum leak, if any, from a vacuum vessel, of an absorption chiller, for example, in which water and solution are charged, quickly, easily and with a high accuracy whether the vacuum vessel is in or out of operation, and thus greatly contributes to the improvement in maintenance inspection of the equipment incorporating that vacuum vessel.

Also the apparatus according to the present invention can carry out the above-mentioned method easily, positively and effectively.

What is claimed is:

1. A method for detecting a leak of a vacuum vessel in which water used as refrigerant and a solution used as working fluid are charged, comprising the steps of:
   purging a gas in the vacuum vessel by an air pump while spraying a helium gas to the outer surface of the vacuum vessel;
   diverting a part of the purged gas by a branch pipe provided in a purge piping;
   passing the diverted purged gas through a dehumidifier to remove water vapor contained in the gas to enhance the detectability of the helium gas;
   regulating a pressure of the dehumidified gas in accordance with a power of the dehumidifier by a pressure regulating valve provided in the branch pipe, and
   detecting the helium gas in the dehumidified gas by a mass spectrometer-based helium leak detector.

2. A method for detecting a leak of a vacuum vessel in which water used as refrigerant and a solution used as working fluid are charged, comprising the steps of:
   purging a gas in the vacuum vessel by an air pump via a dehumidifier while spraying a helium gas to the outer surface of the vacuum vessel;
   leading the purged gas from which water vapor has been removed by the dehumidifier to enhance the detectability of the helium gas from the suction side of the air pump;
   regulating a pressure of the dehumidified gas in accordance with a power of the dehumidifier by a pressure regulating valve, and
   detecting the helium gas in the dehumidified gas by a mass spectrometer-based helium leak detector.

3. A method for detecting a leak from a vacuum vessel in which water used as refrigerant and a solution used as working fluid are charged, comprising the steps of:
   purging a gas in the vacuum vessel by an air pump via a first dehumidifier while spraying a helium gas to the outer surface of the vacuum vessel;
   diverting a part of the purged gas from which most of the water vapor is removed when passed through the first dehumidifier and which flows into the air pump by a branch pipe provided in a purge piping;
   passing the diverted purged gas through a second dehumidifier to remove the rest of water vapor contaminated in the gas;
   adjusting a pressure of the purged gas at an inflow side of the second dehumidifier so as to match the operating conditions (power) of the first and second dehumidifiers, and
   detecting the helium gas in the dehumidified gas by a mass spectrometer-based helium leak detector.

4. A vacuum leak detecting apparatus with a mass spectrometer based helium leak detector for detecting a leak from a vacuum vessel provided in an absorption refrigerator and in which water used as refrigerant and a solution used as working fluid are charged, comprising:
   first pumping means provided in a purge pipe which is to be connected to the vacuum vessel for purging a gas in the vacuum vessel;
   a dehumidifier connected to the purge pipe at a suction side of the first pumping means for removing water vapor contained in the purged gas;
   first and second valve means, both disposed at an outlet of the dehumidifier in series in the purge pipe;
   second pumping means disposed between the first and second valve means for a further evacuation of the purged gas;
   a turbo-molecular pump connected at the back pressure side thereof to a delivery side of the second valve means and at the high vacuum side thereof to a mass spectrometer tube of a helium leak detector;
   first pressure sensing means for detecting a pressure of the purged gas at the outlet of the dehumidifier and delivering an output signal corresponding to the pressure;
   second pressure sensing means for detecting a pressure of the purged gas at the back pressure side of the turbo-molecular pump and delivering an output signal corresponding to the pressure, and
   an automatic controller to regulate the opening/closing of the first and second valve means and to control the start/stop of the turbo-molecular pump, based on the output signals from the first and second pressure sensing means.

* * * * *